United States Patent
Sarafijanovic et al.

(10) Patent No.: US 11,494,445 B2
(45) Date of Patent: Nov. 8, 2022

(54) GROUP-BASED TAPE STORAGE ACCESS ORDERING

(71) Applicant: International Business Machines Corporation, Armonk, NY (US)

(72) Inventors: Slavisa Sarafijanovic, Adliswil (CH); Mark Alfred Lantz, Adliswil (CH); Paul Merrill Greco, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 16/566,976

(22) Filed: Sep. 11, 2019

(65) Prior Publication Data

US 2021/0073280 A1 Mar. 11, 2021

(51) Int. Cl.
*G06F 16/906* (2019.01)
*G06F 16/11* (2019.01)
*G06F 3/06* (2006.01)

(52) U.S. Cl.
CPC .......... *G06F 16/906* (2019.01); *G06F 3/0605* (2013.01); *G06F 3/0638* (2013.01); *G06F 3/0682* (2013.01); *G06F 16/113* (2019.01)

(58) Field of Classification Search
CPC .... G06F 3/0638; G06F 3/0605; G06F 3/0682; G06F 3/061; G06F 3/0659; G06F 16/113; G06F 16/906
See application file for complete search history.

(56) References Cited

U.S. PATENT DOCUMENTS

| | | | |
|---|---|---|---|
| 4,237,497 A * | 12/1980 | Trevithick | G11B 27/107 |
| 5,758,335 A * | 5/1998 | Gray | G06F 16/24544 |
| 5,845,316 A | 12/1998 | Hillyer et al. | |
| 6,349,356 B2 | 2/2002 | Basham et al. | |
| 6,763,427 B1 | 7/2004 | Doi et al. | |
| 7,852,741 B2 * | 12/2010 | Park | G11B 20/1217 369/275.1 |
| 8,082,388 B2 | 12/2011 | Bello et al. | |

(Continued)

FOREIGN PATENT DOCUMENTS

WO 2010073776 A1 7/2010

OTHER PUBLICATIONS

Ruse et al., "Enhancing the low-level tape layer of CERN Tape Archive software", University Politehnica of Bucharest Faculty of Automatic Control and Computers Computer Science and Engineering Department, Master Thesis, Sep. 2017, 32 pages. https://cds.cern.ch/record/2282014/files/CERN-THESIS-2017-131.pdf.

(Continued)

*Primary Examiner* — Etienne P Leroux
(74) *Attorney, Agent, or Firm* — Timothy J. Singleton

(57) ABSTRACT

A method for data storage tape access ordering is provided. The method receives an order request for accessing a plurality of data segments stored on a data storage tape. Each data segment is defined by segment characteristics. The method identifies a number of data segments within the plurality of data segments in the order request. The method determines an order model based on the number of data segments and the segment characteristics of the plurality of data segments. The method generates an access order for the plurality of data segments based on the order model and retrieves a subset of data segments from the data storage tape based on the access order.

15 Claims, 7 Drawing Sheets

(56) References Cited

U.S. PATENT DOCUMENTS

| | | | |
|---|---|---|---|
| 8,812,800 B2 | 8/2014 | Usami | |
| 9,021,175 B2 | 4/2015 | Butt et al. | |
| 9,244,628 B2 | 1/2016 | Butt et al. | |
| 9,513,818 B2 | 12/2016 | Whitney | |
| 2001/0034811 A1 | 10/2001 | Basham et al. | |
| 2011/0149707 A1* | 6/2011 | Ozeki | G06F 3/0647 369/84 |
| 2012/0154946 A1 | 6/2012 | Katagiri et al. | |
| 2014/0043710 A1 | 2/2014 | Katagiri et al. | |
| 2014/0380064 A1* | 12/2014 | Resch | G06F 21/00 713/193 |
| 2017/0046077 A1* | 2/2017 | Whitney | G06F 3/0643 |
| 2017/0147451 A1* | 5/2017 | Iwasaki | G06F 3/0685 |
| 2017/0242627 A1* | 8/2017 | Mills | G06F 3/0659 |
| 2019/0312783 A1* | 10/2019 | Janardhana | H04L 41/12 |

OTHER PUBLICATIONS

"Time-Based Access Order System for Increasing File Read Throughput on Tape", Spectra, Jul. 2018, Copyright © 2018 Spectra Logic Corporation, 13 pages. https://edge.spectralogic.com/index.cfm?&fuseaction=home.displayFile&DocID=5035.

"What is LTO Technology?", Ultrium LTO, printed Jun. 7, 2019, 4 pages. https://www.lto.org/technology/what-is-lto-technology/.

"Programming Reference", IBM Tape Device Drivers, IBM, Eighth Edition (Dec. 2013), pp. 207-210.

Sarafijanovic et al., "Access Ordering for Tape Cycle Optimization", U.S. Appl. No. 16/566,964, filed Sep. 11, 2019.

List of IBM Patents or Patent Applications Treated as Related, dated Sep. 10, 2019, 2 pages.

* cited by examiner

GROUP-BASED TAPE STORAGE ACCESS ORDERING

BACKGROUND

Data storage tape is commonly used due to cost advantages over other storage technologies. Data storage tape is often used for storing large amounts of data, where that data is infrequently accessed, and for which increased access time is acceptable. Data storage tape is often used for data backup and archiving, regulatory compliance, and data protection purposes. As users and companies produce more data, increased amounts of infrequently accessed data are generated every year. Such infrequently accessed data presents issues for tape storage users, tape hardware providers, and software providers due to increasing storage costs, access requests, and efficiency concerns.

SUMMARY

According to an embodiment described herein, a computer-implemented method for data storage tape access ordering is provided. The method receives an order request for accessing a plurality of data segments stored on a data storage tape. Each data segment is defined by segment characteristics. The method identifies a number of data segments within the plurality of data segments in the order request. The method determines an order model based on the number of data segments and the segment characteristics of the plurality of data segments. The method generates an access order for the plurality of data segments based on the order model and retrieves a subset of data segments from the data storage tape based on the access order.

DETAILED DESCRIPTION

Figure 1:
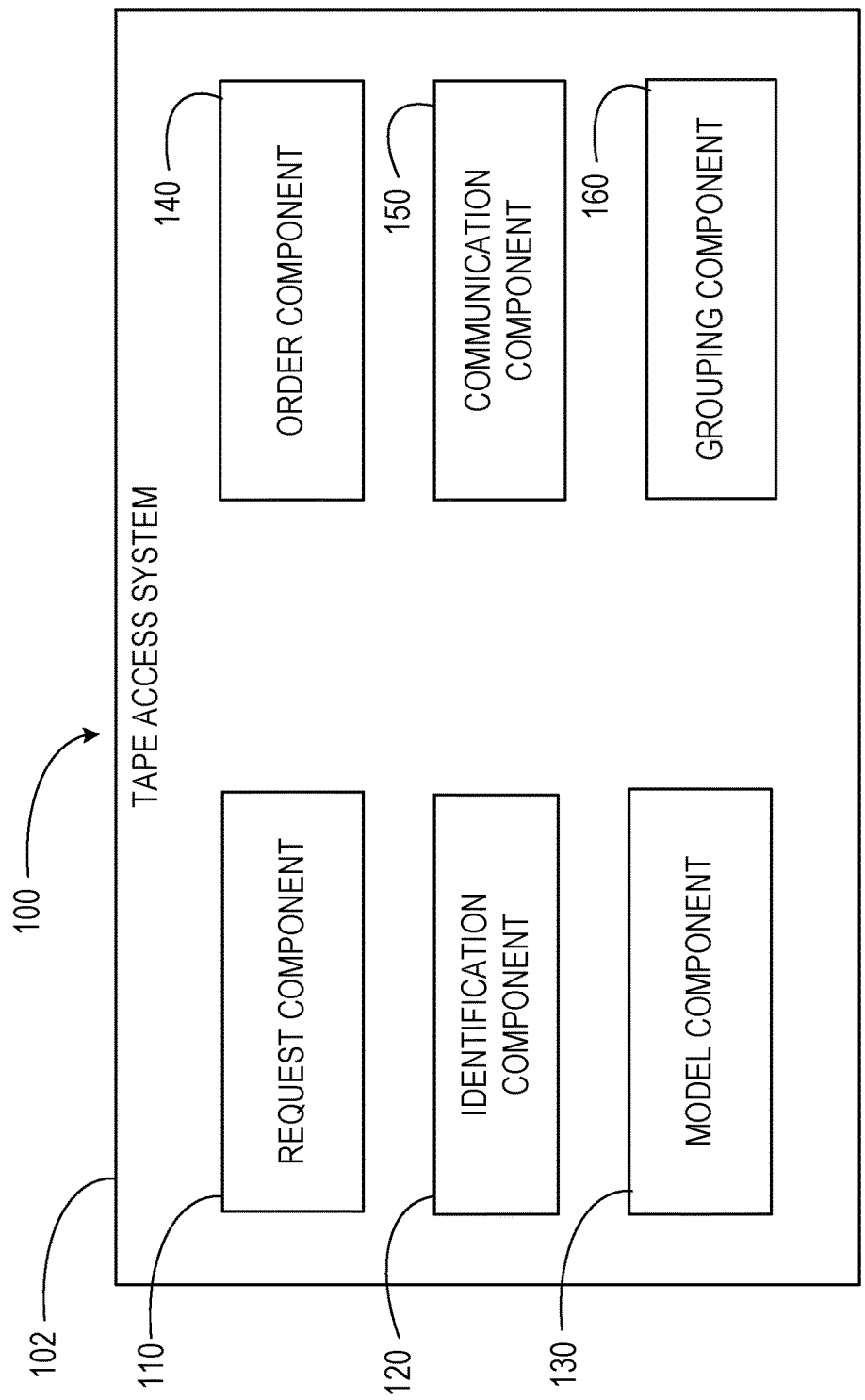
FIG. 1 depicts a block diagram of a computing environment for implementing concepts and computer-based methods, according to at least one embodiment.

The present disclosure relates generally to methods for data access and retrieval. In particular, but not exclusively, the present disclosure relates to a computer-implemented method for ordering access of data segments on a data storage tape. The present disclosure relates further to a related system for data access and retrieval, and a computer program product for operating such a system.

Data storage tapes are often used for storing large amounts of infrequently accessed data. Data stored on these data storage tapes may be long lasting and cost effective. However, accessing specific records, files, or data stored on these data storage tapes often includes inefficiencies relating to access, processing, and retrieval times. While data storage tapes are often inexpensive, relative to their storage capacity, efficient usage of tape drives for reading data storage tapes is important due to expense and availability of tape drives used to service a tape storage system or repository workload. Purchase, servicing, and availability of tape drives may introduce additional costs to tape storage systems. When tape drives are used, data storage tapes are located and mounted or coupled to the tape drive. The tape drive is directed to access various portions of the tape by physically manipulating portions of the data storage tape in contact with a reader component. Once the selected data is read, the tape drive rewinds the data storage tape to a starting position. The data storage tape may then be removed or unmounted from the tape drive.

While tape storage systems are often used to maintain infrequently accessed data, when that data is called upon for access, some access systems and methodologies may include inefficiencies related to data retrieval of specified data. Data segments designated for retrieval may be files, portions of files, records, or any other data object which may be stored on a data storage tape. Since data storage tapes may include large numbers of data segments, managing and retrieving individual data segments or groups of data segments takes time.

Some tape storage systems identify or provide recommended access orders when groups of data segments are selected for retrieval from one or more data storage tapes. These recommended access orders attempt to efficiently read multiple files or data segments from a given data storage tape. Some tape storage systems provide recommended access orders based on reducing tape seek times for reading multiple data segments from a given data storage tape. Such tape storage systems may omit consideration of a last data segment's ending position, rewind time, and unmounting time from the recommended access order. Further such tape storage systems may focus on access of a single data storage tape when providing the recommended access order, omitting consideration of reading or accessing data from multiple data storage tapes. In such instances, where a tape drive is used to access a series of data storage tapes consecutively, a total tape cycle time (e.g., tape cycle time across multiple data storage tapes) may not be considered by present recommended access orders.

Tail insertion methods may be used for generating access orders. Tail insertion ordering may optimize a read order of data segments where a number of data segments to be read from a tape, or from a tape mount, is within a specified range. For example, tail insertion may optimize read orders for a set of data segments between one and ten. In some instances, a brute force methodology to search all permutations for ordering data segments to be read from a tape may be used. Brute force methodologies may become more computationally expensive as the number of data segments increases. Tail insertion methods may also become computationally expensive where the number of data segments increase. Tail insertion methods may use recurrent optimization steps. For example, a tail insertion system may first use a greedy algorithm for initially ordering segments, starting from a beginning of a data storage tape to find a closest segment based on seek time to the beginning of the segment. The tail insertion methods may then find a next closest segment from an end of the initial data segment. The tail insertion method may continue in this manner until all data segments from a list have been ordered. The tail insertion methods may then recursively apply a tail insertion step, moving a last tail segment by inserting it higher in an ordered list if the new order decreases an overall seek and read time for all segments in the list. Tail insertion methods may consider moving single segments for list ordering. In some instances, such considerations omit reordering options for jointly optimizing cumulative inter-segment seek and rewind times. For example, for a rewind time to be small, the end of an access order would be close to a beginning of the data storage tape. If the tape drive implements a tape re-tensioning step prior to unloading the cartridge, then the end of an access order would be close to the end of the data storage tape or close to furthest location along the length tape accessed during that mount cycle. Such a situation may be overlooked by a tail insertion method, focusing on local minimum times over cumulative inter-segment seeks and rewind times.

Embodiments of the present disclosure provide methods, systems, and computer program products for generating optimized access orders (e.g., tape cycle orders) for data storage tapes by tape drives. Optimized access orders or tape cycle orders may be understood as a list of a recommended access order of data segments when reading multiple data segments so that the overall cycle time or the overall read time for reading those data segments is minimized. Such optimized access orders may take into account reading data segments from a single data storage tape or multiple data storage tapes. The optimized access orders may account for use of a single tape drive or multiple tape drives. The optimized access orders may account for a total tape cycle time including mounting a data storage tape, seek and read times, rewind times, and unmounting times for data segments on a single data storage tape or across multiple data storage tapes, whether using a single tape drive or multiple tape drives. The optimized access orders may also account for total tape read time of a single data storage tape or multiple data storage tapes.

Some embodiments of the present disclosure provide methods, systems, and computer program products which select between order models. In some embodiments, the present disclosure enables a tape drive or tape access system to select between an ordering mode optimized for total read time and an ordering mode optimized for total tape cycle time. Some order models described in the present disclosure increase a probability of having a group starting close to a beginning of a data storage tape and another group ending close to a beginning of the tape so to reduce total cycle time for reading the data segments according to a generated access order. At each step of the order model, a next globally closest segment is added to a group, minimizing times independent of segment size. In another embodiment for tape drives that implement a re-tensioning step prior to cartridge unload, some order models described in the present disclosure increase a probability of having a group starting close to a beginning of a data storage tape and another group ending close to the end of the tape so to reduce total cycle time for reading the data segments according to a generated access order.

In some embodiments, the drive mode and tape cycle order minimize a sum of the tape seeks and the tape rewind time, thus minimizing the overall tape cycle time. Thus, the drive mode and tape cycle order may reduce tape cycle times for data access operations for data storage tapes and increase workloads capable of being performed by one or more tape drives.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may comprise a tape access system 102. The tape access system 102 may comprise a request component 110, an identification component 120, a model component 130, an order component 140, a communication component 150, and a grouping component 160. The request component 110 receives order requests for accessing data segments stored on data storage tapes. The identification component 120 identifies data segment characteristics and numbers of data segments contained within the order request. The model component 130 determines an order model based on the number of data segments and the segment characteristics of the plurality of data segments. The order component 140 generates an access order for the plurality of data segments based on the order model. The communication component 150 transmits the access order to a tape drive coupled to the data storage tape. The grouping component 160 generates groups of data segments for the ordering component 140. Although described with distinct components, it should be understood that, in at least some embodiments, components may be combined or divided, or additional components may be added, without departing from the scope of the present disclosure.

Figure 2:
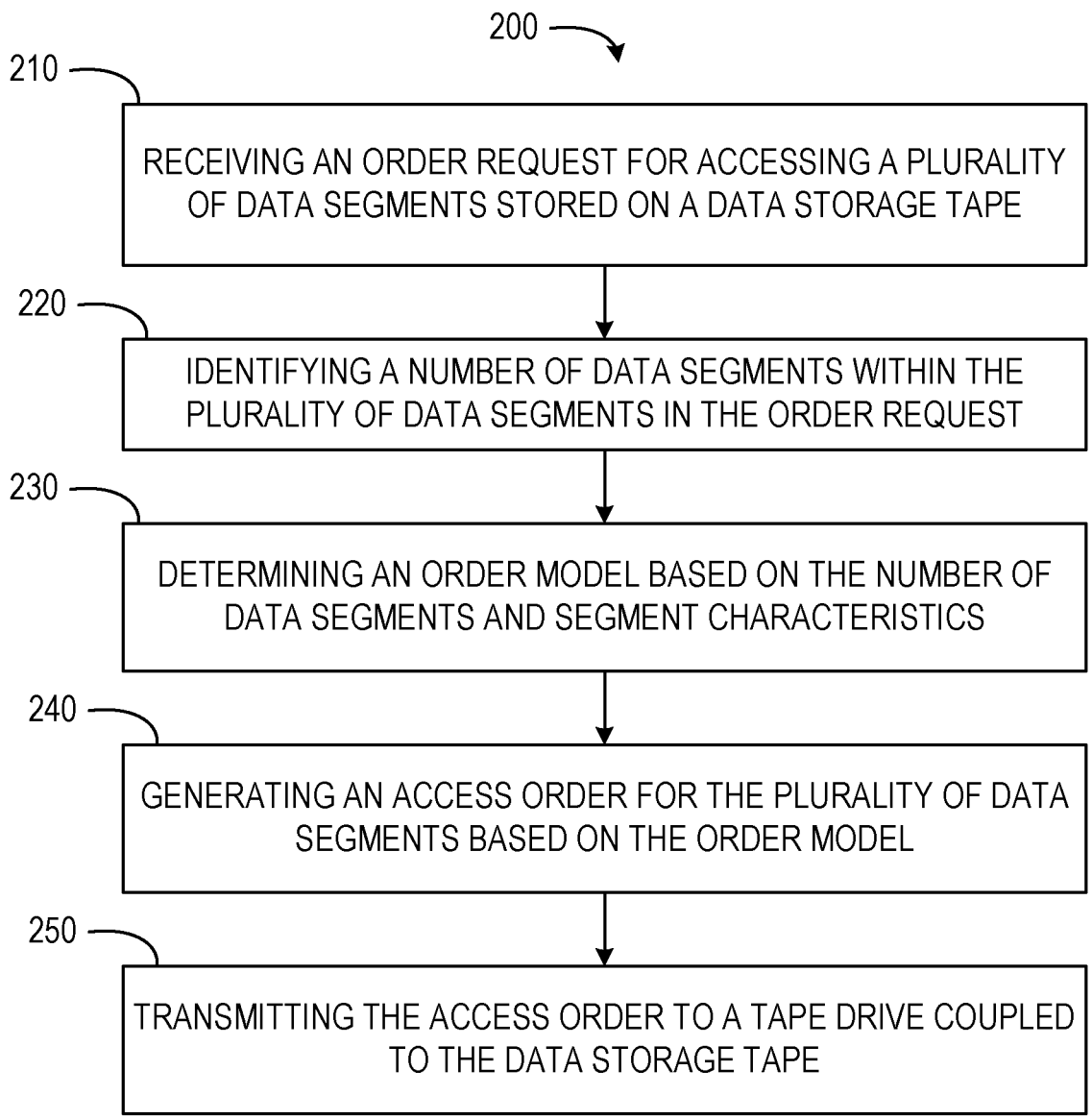
FIG. 2 depicts a flow diagram of a computer-implemented method for data storage tape access ordering, according to at least one embodiment.

Referring now to FIG. 2, a flow diagram of a computer-implemented method 200 is shown. The computer-implemented method 200 is a method for data storage tape access optimization. In some embodiments, the computer-implemented method 200 may be performed by one or more components of the computing environment 100, as described in more detail below.

At operation 210, the request component 110 receives an order request for accessing a plurality of data segments stored on a data storage tape. In some embodiments, each data segment is defined by segment characteristics. The segment characteristics may include a data segment size, a data storage tape location for each data segment on a data storage tape, a relationship between data segments stored on single data storage tape or stored on different data storage tapes, identifiers for the data segments, combinations thereof, and any other suitable characteristics describing data segments or the data storage tapes on which the data segments are stored. For example, each data segment may be stored on a data storage tape. Metadata describing or defining each data segment, including the segment characteristics, may be stored in a tape map. The tape map may include a size of the data segment, an identification or name of the data segment, a length of the data segment on the data storage tape (e.g., a starting position and an ending position of the data segment on the data storage tape), and a link location (e.g., additional positions on a data storage tape at which at least a portion of the data segment is stored).

In some embodiments, the request component 110 receives the order request as part of an access request for access or retrieval of the plurality of data segments from the data storage tape coupled to a tape drive. The order request may query the tape access system 102 for an order of accessing the plurality of data segments on the data storage tape according to one or more constraint. Order constraints may include a maximum tape cycle time, a tape read time, number of segments to be accessed, average size of segments to be accessed, actual sizes of each segment to be accessed, number of data storage tapes to be accessed, or any other suitable order or accessing constraints. Once received, the request component 110 reads the order request, identifies the order constraints, and passes at least a portion of the order request to one or more components of the tape access system 102.

At operation 220, the identification component 120 identifies a number of data segments within the plurality of data segments in the order request. The number of data segments may be identified from the order request, from data passed from the request component 110, or in any other suitable manner. In some embodiments, the identification component 120 compares the number of data segments to a segment threshold, determining whether the number of data segments is greater than the segment threshold.

In some instances, the identification component 120 identifies a size of each data segment of the plurality of data segments. The identification component 120 may also determine a tape position of each data segment and whether each data segment of the plurality of data segments are stored on a single data storage tape or stored across multiple data storage tapes. The identification component 120 may identify or determine the size and storage location of the data segments from one or more of the order request and the tape map.

At operation 230, the model component 130 determines an order model based on the number of data segments and the segment characteristics of the plurality of data segments. In some embodiments, the model component 130 determines the order model from a plurality of order models. Each order model of the plurality of order models may be configured to define an access order for the plurality of data segments using a distinct model scheme.

In some embodiments, the model component 130 determines the order model by determining whether the number of data segments exceeds the segment threshold. In such instances, the model component 130 selects a first order model configured to order large numbers of data segments. The model component 130 may also consider one or more of the size and storage location of the plurality of data segments. For example, where the sizes or average sizes of the data segments exceed a size threshold, the model component 130 may select a second order model configured for large sized data segments. In instances where the data segments are stored on a single data storage tape or stored across multiple data storage tapes, the model component 130 may select the first order model or the second order model, respectively. Although described with respect to first and second order models, it should be understood that the model component 130 may determine or select the order model from any number of order models.

At operation 240, the order component 140 generates an access order for the plurality of data segments based on the order model. The order component 140 accessing or otherwise using the selected order model, generates the access order for the plurality of data segments by organizing an access structure for the plurality of data segments according to the selected order model. For example, where the selected order model is configured to minimize read time, the order component 140 generates the access order for the plurality of data segments as an order having a shortest read time for accessing or reading all of the plurality of data segments. Where the selected order model is configured to minimize a total tape cycle time, the order component 140 generates the access order for the plurality of data segments as an order having a shortest cycle time (e.g., a shortest time for reading the plurality of data segments and rewinding the data storage tape to a start position).

In some embodiments, the order component 140 generates the access order by generating a set of permutations. The permutations may be understood as a set of access orders from which the order component 140 may select a suitable access order for accessing the plurality of data segments. For example, where the order model is configured to provide a minimized tape read time, the order component 140 may select the permutation with the lowest tape read time of the set of permutations. By way of further example, where the order model is configured to provide a minimized tape cycle time, the order component 140 may select a permutation associated with a lowest tape cycle time.

In some embodiments, the set of permutations include permutations having grouped data segments. These permutations may be understood as permutations configured for concatenating the two or more groups. The grouped data segments may be data segments found to be consecutive data segments on the data storage tape or data segments being separated by a distance below a distance threshold on the data storage tape. In such embodiments, one or more data segments may be grouped together. Each permutation of the set of permutations may define one or more of an order of accessing individual data segments, a number of groups of data segments and which data segments of the plurality of data segments are grouped together, an order of accessing data segment groups, an order of accessing a portion of individual data segments and a portion of data segment groups, combinations thereof, and any other suitable permutation for ordering and grouping data segments.

For each permutation, the order component 140 determines an access time for the plurality of data segments. The order component 140 may determine the access time for the plurality of data segments may be understood as a combination of times relative to reading and accessing the data segments. In some embodiments, based on the order model the order component 140 determines read times for each data segment, seek times for each data segment, and rewind times from each data segment. The seek times may be determined from a start point of the data storage tape, from a previous data segment, from a nearest data segment, combinations thereof, or any other suitable point to a start point of each segment. The rewind times may be determined from an end point of each data segment to a start point of the data storage tape, a start point of a previous data segment, a start point of a closest data segment, combinations thereof, or any other suitable start point.

In some embodiments, the order component 140 first groups segments into a number of internally ordered groups by adding a data segment to another data segment or group to minimize, at each step, an increase of the cumulative seek time across the groups and data segments. The first group may be formed by joining two data segments which are closest, in terms of seek time from one to the other. The remaining data segments may be considered for forming a new group, joining to the first group, or remaining as distinct data segments. In some instances, remaining data segments may be added to new groups unless a maximum allowed number of groups is already formed. The order component 140 may then concatenate the groups. The groups may be concatenated in one or more ways to generate permutations of groups. Each permutation of groups may represent an ordered list of data segments. In some embodiments, a number of groups may be constrained to a predetermined or dynamically determined number of groups. The limited number of groups may enable the order component 140 to concatenate groups and data segments in an ordered list in a computationally efficient manner.

In some embodiments, the order component 140 selects a permutation of the two or more groups. Selection of the permutation may be based on the order model determined in operation 230. For example, selection of the permutation may be based on the access time for each permutation. Selection of the permutation may also be based on tape cycle time. The permutation may be selected based on any characteristic or model scheme. In some instances, the selected permutation represents the access order.

At operation 250, the communication component 150 transmits the access order to a tape drive coupled to the data storage tape. In embodiments where the tape access system 102 is distinct, but communicatively coupled to the tape drive, the communication component 150 transmits the access order to the tape drive via one or more data connections. The data connections may be wired connections, wireless connections, network connections, logical connections, combinations thereof, or any other suitable electronic communications structure, instructions, or means. In embodiments where the tape access system 102 is part of the tape drive (e.g., implemented in control software of the tape drive), the communications component 150 may transfer or pass the access order to a drive component of the tape drive to initiate reading, recall, or other access to the plurality of data segments on the data storage tape according to the access order.

In some instances, a recommended access order can be computed using the above described components implemented by a tape drive. The recommended access order can be computed using the above described components implemented in a computing system external to a tape drive and transmitted or passed thereto. The access order can be transmitted from a tape drive to a user application that queried the tape drive for the access order for a list of data segments. The application can then read those segments serially, one by one, in the order of the access order.

In embodiments where the access order is computed using components implemented on a tape drive, the communication component 150 may transmit the access order to an access component of the tape drive. The access component retrieves a subset of data segments from the data storage tape based on the access order. The access component may retrieve the subset of data segments, identified or arranged by the access order, by causing one or more components of the tape drive to perform one or more operations on the data storage tape. The components of the tape drive (e.g., a drive component) may cause the tape drive to perform one or more seek, read, copy, and transmit operations to physically manipulate a position of the data storage tape and retrieve each data segment of the subset of data segments according to the access order. Once a final data segment of the subset of data segments has been accessed, read, and transmitted to the access component, the access component may cause the tape drive to rewind the data storage tape back to a start position for dismounting. Although described with respect to transmitting the accessed data segments to the access component, in some embodiments, the access component causes the tape drive to perform operations to access and retrieve the subset of data segments. Once the final data segment has been accessed and read, the access component may cause the tape drive to transmit the retrieved data segments before, during, or after the tape drive rewinds the data storage tape. The access component may also generate an indication of completion, where no additional data segments are to be read or no different start position is warranted.

Figure 3:
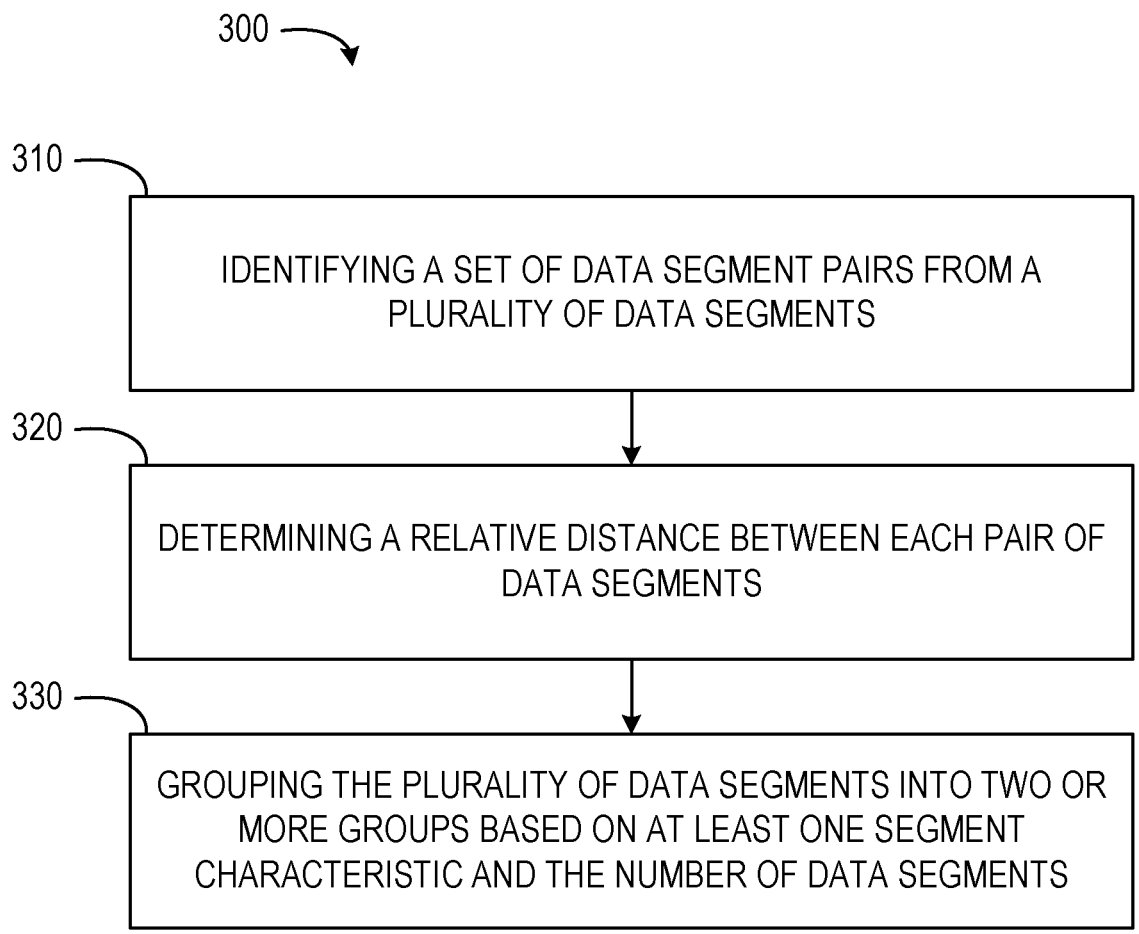
FIG. 3 depicts a flow diagram of a computer-implemented method for data storage tape access ordering, according to at least one embodiment.

FIG. 3 shows a flow diagram of an embodiment of a computer-implemented method 300 for data storage tape access optimization. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the grouping component 160 identifies a set of data segment pairs from a plurality of data segments. In some embodiments, the grouping component 160 identifies the set of data segment pairs as consecutive data segments on the data storage tape. Consecutive data segments may be understood as data segments occurring with no intervening space on the data storage tape separating the data segments. Data segments may also be consecutive where a distance on the data storage tape separating the data segment pairs is below a threshold distance. The set of data segment pairs may be identified as logical segments, where each pair of data segments is a distinct logical segment. Thus, the grouping component 160 may initially create a set of logical segments. In some embodiments, data segment pairs are ordered pairs. For example, data segment 1 and data segment 2 may be an ordered pair, and data segment 2 and data segment 1 may be a distinct ordered pair. A distance from an end of data segment 1 to a beginning of data segment 2 may be distinct from a distance from an end of data segment 2 to a beginning of data segment 1.

In operation 320, the grouping component 160 determines a relative distance between each pair of data segments. As described above, in some embodiments, the grouping component 160 generates a set of logical segments from the set of data segment pairs. In such instances, the grouping component 160 determines inter-segment distances between the logical segments as the relative distances between pairs of data segments. In some embodiments, a portion of the plurality of data segments are identified as part of the set of data segment pairs, with a portion of the data segments remaining unpaired. In such instances, the grouping component 160 determines relative distances between each logical segment (e.g., pairs of data segments) or data segment and the remaining logical segments and data segments of the set of logical segments and unpaired segments.

In some embodiments, the grouping component 160 generates a set of relative distances from the relative distances between each pair of data segments. The distance between two logical segments, two unpaired data segments, or a logical segment and an unpaired data segment may be calculated in terms of a time for seeking from an end of a first segment to a beginning of a second segment. In some embodiments, the set of data segment pairs and relative distances between each data segment pair represents a distance matrix for the plurality of data segments. The distance matrix may be an N×N matrix of mutual distances for N logical segments, unpaired segments, or combinations thereof.

In operation 330, the grouping component 160 groups the plurality of data segments, or logical segments, into two or more groups based on at least one segment characteristic and the number of data segments. In some embodiments, the grouping component 160 groups the plurality of data segments by generating two or more groups of data segments based on the set of relative distances between each pair of data segments and the number of data segments. The set of relative distances represent the at least one segment characteristic.

In some embodiments, the grouping component 160 groups the plurality of data segments by initially generating the set of logical segments, as in operation 310. The grouping component 160 may then determine relative distances between the logical segments, as in operation 320. The grouping component 160 then groups the logical segments as access groups to further subdivide the plurality of data segments being considered in permutations by the order component 140.

Figure 4:
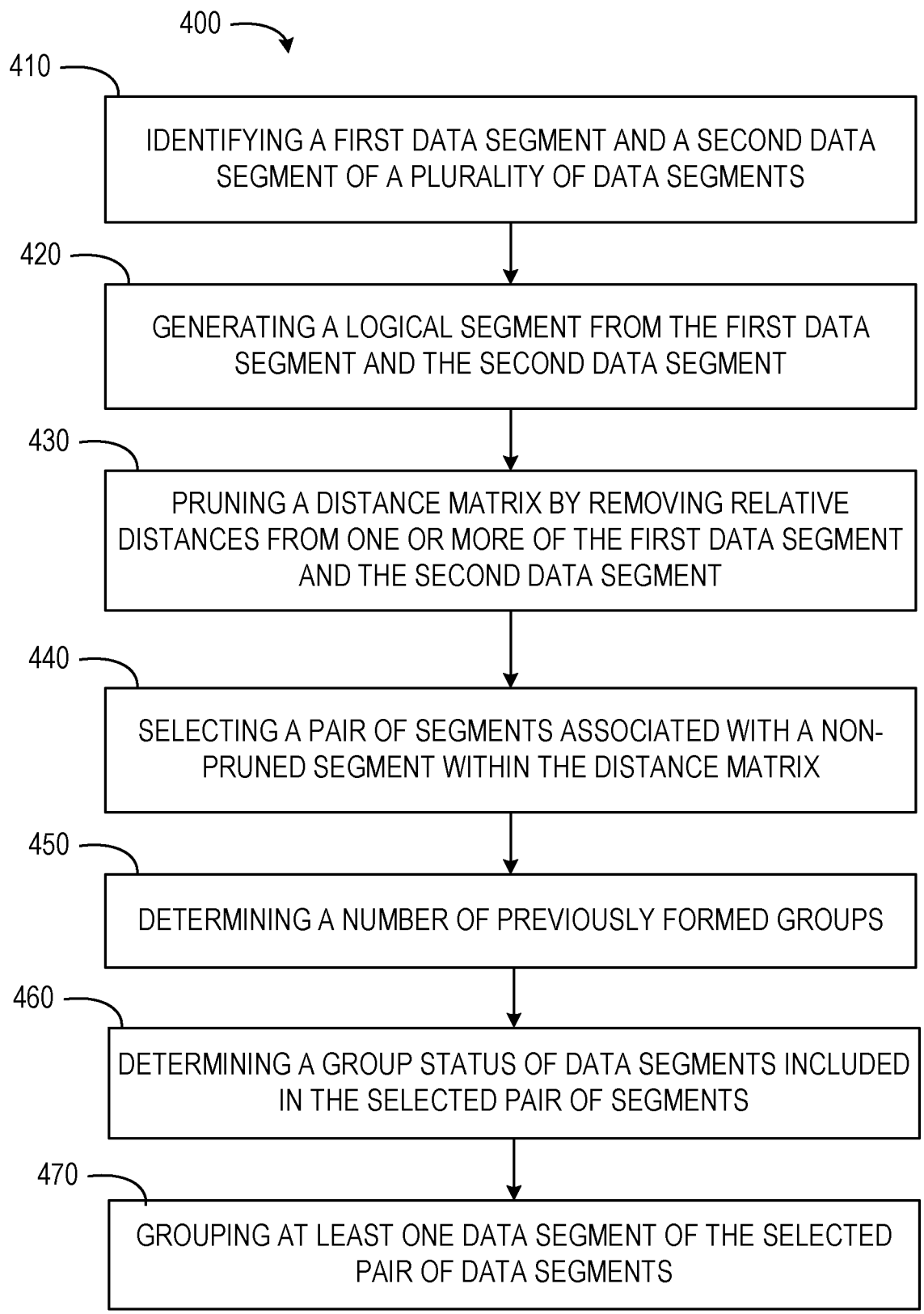
FIG. 4 depicts a flow diagram of a computer-implemented method for data storage tape access ordering, according to at least one embodiment.

FIG. 4 shows a flow diagram of an embodiment of a computer-implemented method 400 for data storage tape access optimization. The method 400 may be performed by or within the computing environment 100. In some embodiments, the method 400 comprises or incorporates one or more operations of the methods 200 or 300. In some instances, operations of the method 400 may be incorporated as part of or sub-operations of the methods 200 or 300.

In operation 410, the grouping component 160 identifies a first data segment and a second data segment of the plurality of data segments. In some embodiments, the first data segment and the second data segment are consecutive data segments on the data storage tape. The grouping component may identify the first data segment and the second data segment as described above with respect to operations 310.

In operation 420, the grouping component 160 generates a logical segment from the first data segment and the second data segment. In some embodiments, the logical segment represents a data segment of the plurality of data segments. The logical segment may be generated by combining, linking, or otherwise associating the first and second data segments while the access order is being generated. The logical segment may represent an ordered list of the first and second data segments.

In operation 430, the grouping component 160 prunes the distance matrix by removing relative distances from one or more of the first data segment and the second data segment to an additional data segment of the plurality of data segments. In some embodiments, the grouping component 160 prunes the distance matrix by removing relative distances from a data structure representing the distance matrix. The data structure may be used by one or more of the grouping component 160 and the order component 140 to group or order, respectively, the data segments or logical segments. The grouping component 160 may prune the relative distance between the first and second data segments from the distance matrix, thus removing the relative distance and the first and second data segments as candidates for further grouping.

For example, if a segment $S_n$ was appended to a group, distance matrix entries corresponding to distances from other data segments to the appended data segment may be pruned. In such instances, removal of the distance matrix entries may preclude the segment from being appended in a subsequent grouping operation. By way of further example, if the segment $S_n$ is appended to segment $S_m$, the distance matrix entries corresponding to distances from $S_m$ to other segments may also be pruned. In such instances, the grouping component 160 has already appended a data segment, $S_n$, to the data segment $S_m$, thus another data segment may not be appended to the tail end of the data segment $S_m$. Similar pruning may be done if data segment $S_n$ is prepended to another segment or a group of data segments. Each group of data segments may thus be understood as an ordered list or partial ordered list of data segments, and, when additional data segments added to the group by appending or prepending, these additional data segments are added to the ordered list or partial ordered list.

In operation 440, the grouping component 160 selects a pair of segments associated with a non-pruned segment within the distance matrix. In some embodiments, the grouping component 160 selects the pair of segments associated with or corresponding to a smallest non-pruned distance in the distance matrix. In some instances, the selected pair of segments are consecutive. The selected pair of segments may also be determined to be non-consecutive but the closest non-pruned segments within the distance matrix.

In operation 450, the grouping component 160 determines a number of previously formed groups. The grouping component 160 may determine the number of previously formed groups based on tags or other metadata entered into the distance matrix for each of the data segments or pairs of data segments. In some embodiments, the grouping component 160 compares the number of previously formed groups to a group threshold. Where a current number of groups (e.g., previously formed groups) is below the group threshold, the grouping component 160 may continue grouping pairs or subsets of the data segments. Where the current number of groups meets or exceeds the group threshold, the grouping component 160 may terminate further grouping of data segments. The grouping component 160 may also prune a distance matrix entry for the relative distance between the pair of data segments, selected in operation 440. In some instances, once the grouping component 160 finishes grouping data segments, the tape access system 102 may proceed with generating the access order or permutations from which the access order is derived.

In some embodiments, the group threshold is dynamically determined. The tape access system 102 may balance a number of groups against a permutation time. For example, increasing a number of groups may lead to decreased tape cycle or tape read times while also increasing a permutation time for identifying and ordering permutations to determine an access order. In some embodiments, the grouping component 160 dynamically determines the group threshold based on one or more segment characteristics. The grouping component 160 may determine the group threshold based on a number of data segments to be accessed or grouped, a size of each data segment, an average size of the data segments, a distance between each data segment, an average distance between data segments, combinations thereof, or any other suitable segment or access characteristic. For example, the grouping component 160 may limit the group threshold to five groups where the number of data segments is large. Where the number of data segments is smaller, the grouping component 160 may increase the group threshold. By way of further example, the grouping component 160 may dynamically determine a group threshold of eight to ten, given a designated number of data segments, based on an access characteristic designating a limit on computational time for generating the access order.

In operation 460, the grouping component 160 determines a group status of data segments included in the selected pair of segments. In some embodiments, the grouping component 160 determines the group status of data segments based on a tag or metadata within the distance matrix. In some instances, the grouping component 160 determines the group status based on inclusion of a relative distance between data segments of the selected pair and other data segments. The grouping component 160 may determine the grouping status of the data segments within the selected pair of segments to determine whether a data segment has been previously grouped. Previous grouping may indicate grouping of a first data segment of the pair of segments to a second data segment of the pair of segments. Previous grouping may also indicate grouping of a data segment within the selected pair of segments with a data segment outside of the selected pair of data segments or with another group of data segments or logical segment.

In operation 470, the grouping component 160 groups at least one of the data segments of the selected pair of data segments. In some embodiments, the grouping component 160 groups the data segments based on the number of previously formed groups and the group status of the data segments. Where the grouping component 160 has already previously formed groups equal to or exceeding the group threshold, the grouping component 160 may preclude grouping data segments of the selected pair of data segments. Where the current number of groups is below the group threshold, the grouping component 160 may group the at least one data segment of the selected pair of data segments to another data segment or group of data segments.

In some embodiments, the grouping component 160 determines whether a first data segment, of the selected pair of data segments, was previously grouped to one or more other data segments. Where the first data segment was previously grouped, a second data segment of the selected pair of data segments is appended or prepended to the first data segment or the group of data segments to which the first data segment was previously added. Where the grouping component 160 determines the first data segment has not previously been grouped, the grouping component 160 creates a new group of the first data segment and the second data segment. Where the grouping component 160 determines both the first data segment and the second data segment were not previously grouped and the current number of groups is below the group threshold, the grouping component may group the first and second data segments, prune the relative distance entry in the distance matrix between the first and second data segments, and repeat one or more operations of the method 400.

In some embodiments, one or more grouping related operations may be performed repeatedly until the group threshold is reached or no more data segments are available for grouping. In some embodiments, grouping operations include a verification operation. In the verification operation, the grouping component 160 determines whether a proposed or candidate group would create a cycle in data segment ordering. If a cycle would be created, grouping the two segments is skipped. For skipped groups, the relative distance entry between the two data segments is pruned from the distance matrix, and one or more grouping operations (e.g., operations 450-470) may be repeated.

In some embodiments, the grouping component 160 repeatedly performs one or more of operations 410-470 until all data segments of the plurality of data segments are grouped. Once all of the data segments are grouped, the grouping component 160 may pass the groups, or indications of which data segments belong to each group, to the order component 140. The order component 140 may consider all permutations of ordering access to the groups of data segments to generate the access order. In some embodiments, the order component 140 considers all permutations for concatenating the created groups of data segments. The order component 140 may evaluate a resulting tape read time or tape cycle time for each permutation. The permutation with a suitable read time or cycle time may be selected as the access order discussed above in operation 240. In some instances, permutations considered by the order component 140 include differing groupings of data segments. In such embodiments, the grouping component 160 generates a plurality of candidate groups for at least a portion of the plurality of data segments. The order component 140 may evaluate permutations which order or reorder each candidate group of data segments until finding a set of groups and an access order for the set of groups which minimizes one or more of the tape read time, the tape cycle time, or any other suitable segment characteristics or access characteristics. The order component 140 may then select the access order and the associated set of groups, which minimizes an access or segment characteristic associated with the selected order model, as the access order of operation 240.

In some embodiments, the tape access system 102 combines operations from two or more order models. The two or more order models may be combined iteratively or recurrently. The tape access system 102 may combine two or more modes, operations from two or more models, repeat operations from one or more of the order models, combinations thereof, or any other suitable and relevant combination of ordering operations. In some embodiments, the tape access system 102 combines operations of a read time minimization model and a tape cycle time minimization model. The tape access system 102 may perform one or more grouping steps followed by one or more permutation steps. The grouping and permutation steps may be performed iteratively or recurrently. In some instances, once a group of data segments is made, additional group and permutation operations may be performed within the group of data segments. Additional iterative refinement operations may be performed during or after completing the grouping and permutation operations.

Figure 5:
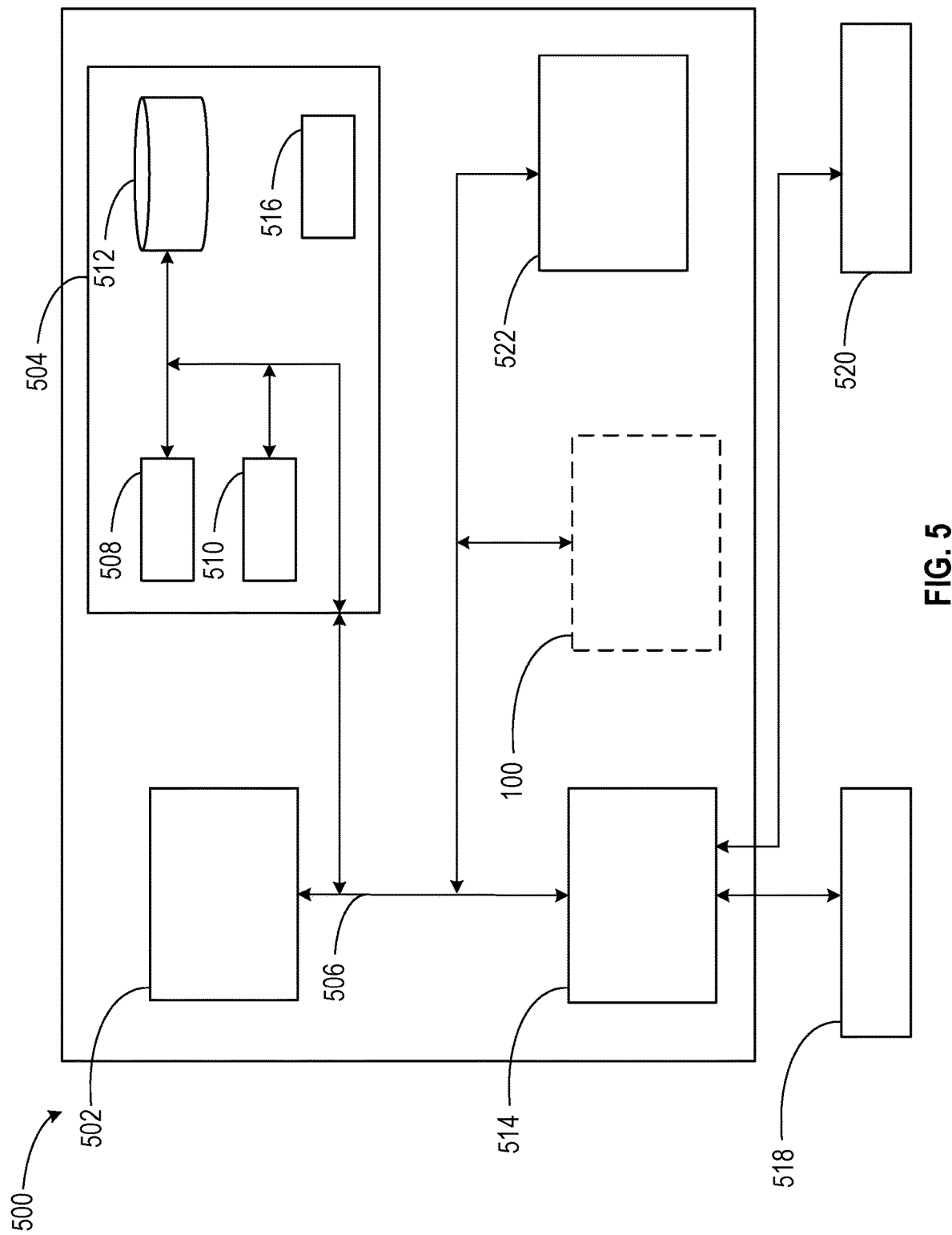
FIG. 5 depicts a block diagram of a computing system for data storage tape access ordering, according to at least one embodiment.

Embodiments of the present disclosure may be implemented together with virtually any type of computer, regardless of the platform being suitable for storing and/or executing program code. FIG. 5 shows, as an example, a computing system 500 (e.g., cloud computing system) suitable for executing program code related to the methods disclosed herein and for group-based data storage tape access ordering.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the request component 110, the identification component 120, the model component 130, the order component 140, the communication component 150, and the grouping component 160, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 6:
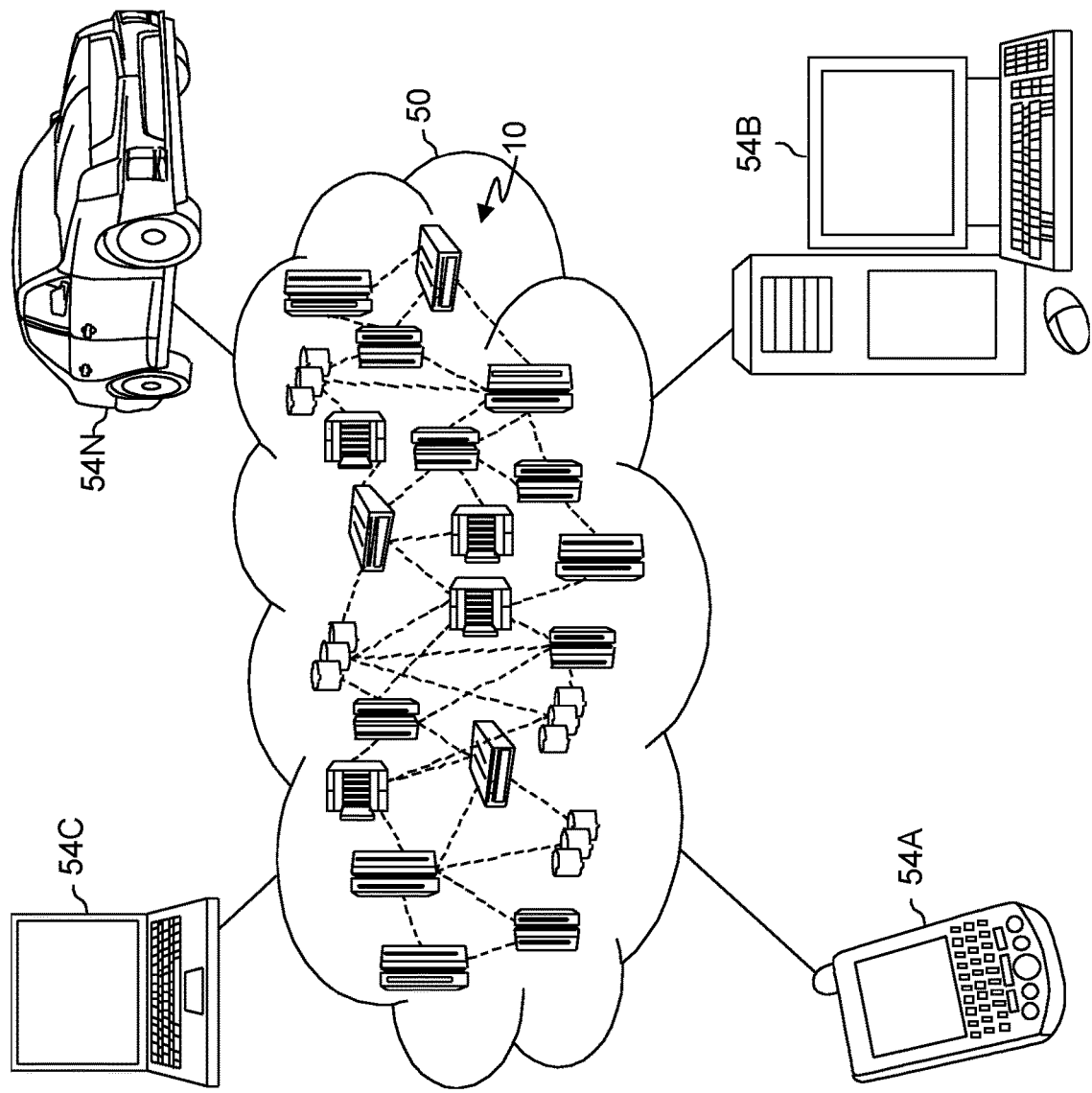
FIG. 6 is a schematic diagram of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
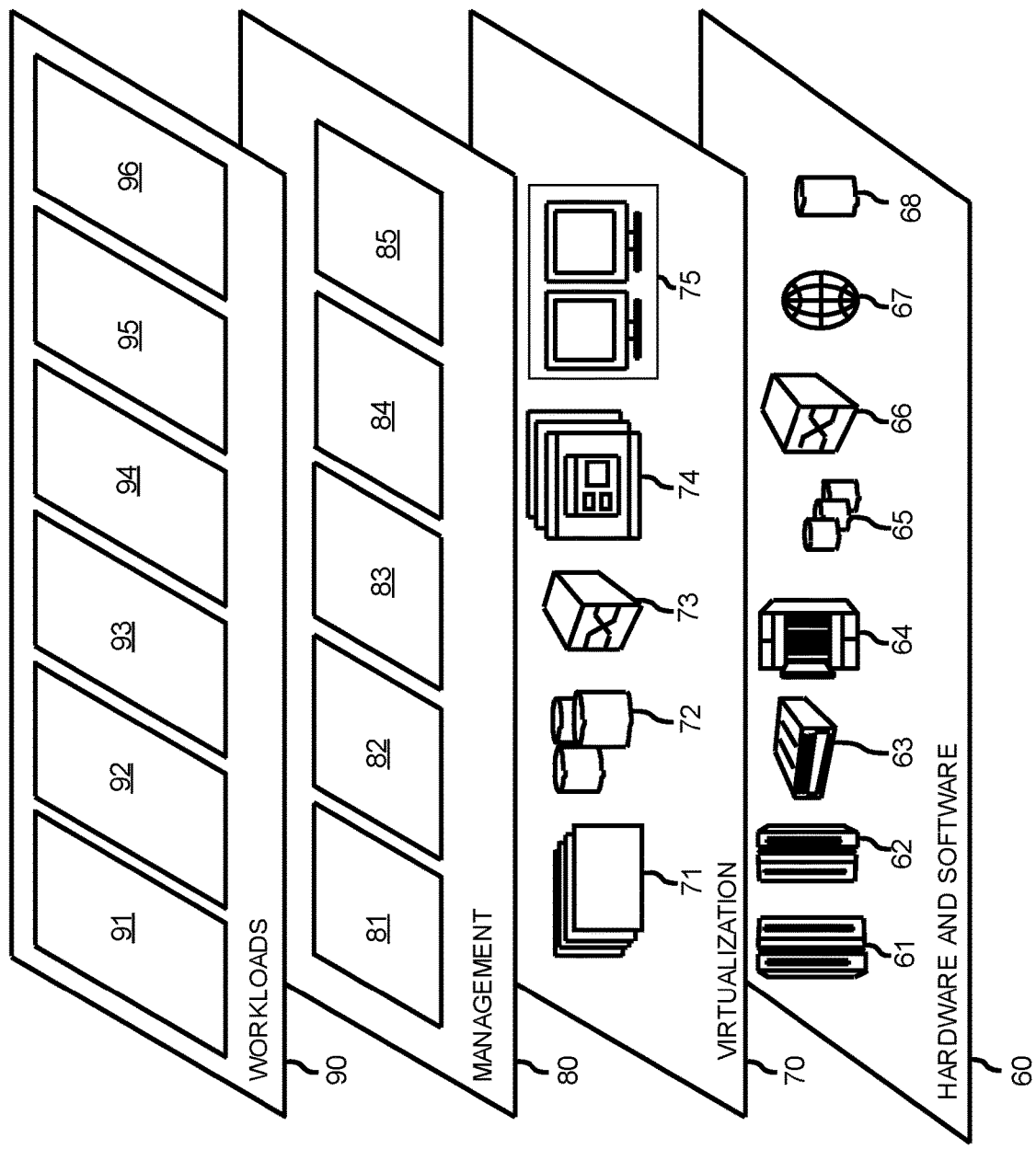
FIG. 7 is a diagram of model layers of a cloud computing environment in which concepts of the present disclosure may be implemented, in accordance with an embodiment of the present disclosure.

Referring now to FIG. 7, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving an order request for accessing a plurality of data segments stored on a data storage tape, each data segment defined by segment characteristics;
    identifying a number of data segments within the plurality of data segments in the order request;
    determining an order model based on the number of data segments and the segment characteristics of the plurality of data segments;
    grouping the plurality of data segments into two or more groups based on at least one segment characteristic and the number of data segments;
    generating an access order for grouped data segments of the plurality of data segments based on the order model, the access order generated from permutations of access orders for the grouped data segments by generating a set of permutations for concatenating the two or more groups, determining an access time for the plurality of data segments for each permutation, and selecting a permutation of the two or more groups based on the access time for each permutation, the selected permutation representing the access order; and
    retrieving a subset of data segments from the data storage tape based on the access order.

2. The method of claim 1, wherein the segment characteristics comprise a data segment size and a data storage tape location for each data segment of the plurality of data segments included in the order request.

3. The method of claim 1, wherein grouping the plurality of data segments further comprises:
   identifying a set of data segment pairs from the plurality of data segments;
   determining a relative distance between data segments of each pair to generate a set of relative distances; and
   generating the two or more groups of data segments based on the set of relative distances and the number of data segments, the set of relative distances representing the at least one segment characteristic.

4. The method of claim 3, wherein identifying the set of data segment pairs further comprises:
   identifying a first data segment and a second data segment of the plurality of data segments, the first data segment and the second data segment being consecutive data segments on the data storage tape; and
   generating a logical segment from the first data segment and the second data segment, the logical segment representing a data segment of the plurality of data segments.

5. The method of claim 4, wherein the set of data segment pairs and relative distances between the segments of each pair represents a distance matrix for the plurality of data segments, and wherein grouping the plurality of data segments further comprises:
   pruning the distance matrix by removing relative distances from one or more of the first data segment and the second data segment to an additional data segment of the plurality of data segments.

6. The method of claim 5, further comprising:
   selecting a pair of segments associated with a non-pruned segment within the distance matrix;
   determining a number of previously formed groups;
   determining a group status of data segments included in the selected pair of segments; and
   based on the number of previously formed groups and the group status of the data segments, grouping at least one of the data segments of the selected pair of data segments.

7. A system, comprising:
   one or more processors; and
   a computer-readable storage medium, coupled to the one or more processors, storing program instructions that, when executed by the one or more processors, cause the one or more processors to perform operations comprising:
      receiving an order request for accessing a plurality of data segments stored on a data storage tape, each data segment defined by segment characteristics;
      identifying a number of data segments within the plurality of data segments in the order request;
      determining an order model based on the number of data segments and the segment characteristics of the plurality of data segments;
      grouping the plurality of data segments into two or more groups based on at least one segment characteristic and the number of data segments;
      generating an access order for grouped data segments of the plurality of data segments based on the order model, the access order generated from permutations of access orders for the grouped data segments by generating a set of permutations for concatenating the two or more groups, determining an access time for the plurality of data segments for each permutation, and selecting a permutation of the two or more groups based on the access time for each permutation, the selected permutation representing the access order; and
      retrieving a subset of data segments from the data storage tape based on the access order.

8. The system of claim 7, wherein grouping the plurality of data segments further comprises:
   identifying a set of data segment pairs from the plurality of data segments;
   determining a relative distance between data segments of each pair to generate a set of relative distances; and
   generating the two or more groups of data segments based on the set of relative distances and the number of data segments, the set of relative distances representing the at least one segment characteristic.

9. The system of claim 8, wherein identifying the set of data segment pairs further comprises:
   identifying a first data segment and a second data segment of the plurality of data segments, the first data segment and the second data segment being consecutive data segments on the data storage tape; and
   generating a logical segment from the first data segment and the second data segment, the logical segment representing a data segment of the plurality of data segments.

10. The system of claim 9, wherein the set of data segment pairs and relative distances between the segments of each pair represents a distance matrix for the plurality of data segments, and wherein grouping the plurality of data segments further comprises:
    pruning the distance matrix by removing relative distances from one or more of the first data segment and the second data segment to an additional data segment of the plurality of data segments.

11. The system of claim 10, wherein the operations further comprise:
    selecting a pair of segments associated with a non-pruned segment within the distance matrix;
    determining a number of previously formed groups;
    determining a group status of data segments included in the selected pair of segments; and
    based on the number of previously formed groups and the group status of the data segments, grouping at least one of the data segments of the selected pair of data segments.

12. A computer program product comprising a computer readable storage medium having program instructions embodied therewith, the program instructions being executable by one or more processors to cause the one or more processors to perform operations comprising:
    receiving an order request for accessing a plurality of data segments stored on a data storage tape, each data segment defined by segment characteristics;
    identifying a number of data segments within the plurality of data segments in the order request;
    determining an order model based on the number of data segments and the segment characteristics of the plurality of data segments;
    grouping the plurality of data segments into two or more groups based on at least one segment characteristic and the number of data segments;
    generating an access order for grouped data segments of the plurality of data segments based on the order model, the access order generated from permutations of access orders for the grouped data segments by generating a set of permutations for concatenating the two or more groups, determining an access time for the plurality of data segments for each permutation, and selecting a permutation of the two or more groups based on the access time for each permutation, the selected permutation representing the access order; and retrieving a subset of data segments from the data storage tape based on the access order.

13. The computer program product of claim 12, wherein grouping the plurality of data segments further comprises:

identifying a set of data segment pairs from the plurality of data segments;

determining a relative distance between data segments of each pair to generate a set of relative distances; and generating the two or more groups of data segments based on the set of relative distances and the number of data segments, the set of relative distances representing the at least one segment characteristic.

14. The computer program product of claim 13, wherein identifying the set of data segment pairs further comprises:

identifying a first data segment and a second data segment of the plurality of data segments, the first data segment and the second data segment being consecutive data segments on the data storage tape; and generating a logical segment from the first data segment and the second data segment, the logical segment representing a data segment of the plurality of data segments.

15. The computer program product of claim 14, wherein the set of data segment pairs and relative distances between the segments of each pair represents a distance matrix for the plurality of data segments, and wherein grouping the plurality of data segments further comprises:

pruning the distance matrix by removing relative distances from one or more of the first data segment and the second data segment to an additional data segment of the plurality of data segments.

* * * * *